(12) United States Patent
de Lucas

(10) Patent No.: US 12,456,257 B2
(45) Date of Patent: Oct. 28, 2025

(54) GRAPHICS PROCESSING SYSTEM AND METHOD OF RENDERING

(71) Applicant: Imagination Technologies Limited, Kings Langley (GB)

(72) Inventor: Enrique de Lucas, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 173 days.

(21) Appl. No.: 18/388,562

(22) Filed: Nov. 10, 2023

(65) Prior Publication Data

US 2024/0193868 A1 Jun. 13, 2024

(30) Foreign Application Priority Data

Nov. 10, 2022 (GB) ...................................... 2216751

(51) Int. Cl.
*G06T 17/20* (2006.01)
*G06T 15/04* (2011.01)
*G06T 15/80* (2011.01)

(52) U.S. Cl.
CPC .............. *G06T 17/20* (2013.01); *G06T 15/04* (2013.01); *G06T 15/80* (2013.01)

(58) Field of Classification Search
CPC .......... G06T 17/20; G06T 15/04; G06T 15/80
See application file for complete search history.

(56) References Cited

U.S. PATENT DOCUMENTS

| 2015/0287165 | A1 | 10/2015 | Berghoff et al. |
| 2017/0316544 | A1 | 11/2017 | Cerny et al. |
| 2018/0061117 | A1 | 3/2018 | Pohl et al. |
| 2019/0066371 | A1 | 2/2019 | Saleh et al. |
| 2022/0414950 | A1 | 12/2022 | Brennan |

FOREIGN PATENT DOCUMENTS

| EP | 3598393 A1 | 1/2020 |
| GB | 2580498 A | 7/2020 |
| WO | 2017/176373 A1 | 10/2017 |

OTHER PUBLICATIONS

Tinkham; "Improved Foveated Rendering with the Fragment Density Map Offset Extension for Vulkan—Qualcomm Developer Network"; Aug. 9, 2022; URL:https://developer.qualcomm.com/blog/improving-foveated-rendering-fragment-density-map-offset-extension-vulkan; pp. 1-9.

*Primary Examiner* — Abderrahim Merouan
(74) *Attorney, Agent, or Firm* — Potomac Law Group, PLLC; Vincent M DeLuca

(57) ABSTRACT

A method of rendering a frame showing a scene formed by primitives in a tile-based graphics processing system includes a geometry processing phase tiling the primitives in the scene, to determine which primitives at least partially overlap which tiles of the frame to be rendered. A rendering phase obtains a fragment density map defining one or more texels, each texel corresponding to an area of the frame to be rendered and having an associated fragment size, wherein for each of the texels, the texel's height is an integer multiple of a native tile height used in the tile-based graphics processing system and the texel's width is an integer multiple of a native tile width used in the tile-based graphics processing system. The rendering phase also determines from the fragment density map a fragment size to be used to render the tile, performing sampling using the determined fragment size and performing fragment shading using the determined fragment size.

18 Claims, 9 Drawing Sheets

GRAPHICS PROCESSING SYSTEM AND METHOD OF RENDERING

CROSS-REFERENCE TO RELATED APPLICATIONS AND CLAIM OF PRIORITY

This application claims foreign priority under 35 U.S.C. 119 from United Kingdom Patent Application No. 2216751.4 filed on 10 Nov. 2022, which is incorporated by reference herein in its entirety.

TECHNICAL FIELD

The present disclosure relates to graphics processing systems, in particular those implementing fragment density maps.

BACKGROUND

Graphics processing systems are typically configured to receive graphics data, e.g. from an application running on a computer system, and to render the graphics data to provide a rendering output. For example, the graphics data provided to a graphics processing system may describe geometry within a three dimensional (3D) scene to be rendered, and the rendering output may be a rendered image of the scene. Some graphics processing systems (which may be referred to as "tile-based" graphics processing systems) use a rendering space which is subdivided into a plurality of tiles. The "tiles" are sections of the rendering space, and may have any suitable shape, but are typically rectangular (where the term "rectangular" includes square). As is known in the art, there are many benefits to subdividing the rendering space into tile sections. For example, subdividing the rendering space into tile sections allows an image to be rendered in a tile-by-tile manner, wherein graphics data for a tile can be temporarily stored "on-chip" during the rendering of the tile, thereby reducing the amount of data transferred between a system memory and a chip on which a graphics processing unit (GPU) of the graphics processing system is implemented.

Tile-based graphics processing systems typically operate in two phases: a geometry processing phase and a rendering phase. In the geometry processing phase, the graphics data for a render is analysed to determine, for each of the tiles, which graphics data items are present within that tile. Then in the rendering phase (e.g. a rasterisation phase), a particular tile can be rendered by processing those graphics data items which are determined to be present within that tile (without needing to process graphics data items which were determined in the geometry processing phase to not be present within the particular tile).

When rendering an image, it is known that the render may use more sample points than the number of pixels with which an output image will be represented. This oversampling can be useful for anti-aliasing purposes, and is typically specified to a graphics processing pipeline as a constant (i.e. a single anti-aliasing rate) for the entire image.

More recently, the idea of selecting particular fragment shading rates has been considered. For example, a render may use fewer shading sample points than the number of pixels (which may be termed 'subsampling') or more shading sample points than the number of pixels (which may be termed 'multisampling'), depending on the situation. Moreover, different parts of the same image may be generated using different fragment shading rates. For example, higher sampling rates may still be useful for anti-aliasing purposes in parts of great detail or focus, but lower shading sampling rates may reduce the processing in rendering areas of uniformity or low importance parts of the image.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A method of rendering a frame showing a scene formed by primitives in a tile-based graphics processing system comprises a geometry processing phase, comprising the step of tiling the primitives in the scene, to determine which primitives at least partially overlap which tiles of the frame to be rendered. The method also comprises a rendering phase comprising a step of obtaining a fragment density map defining one or more texels, each texel corresponding to an area of the frame to be rendered and having an associated fragment size, wherein for each of the texels, the texel's height is an integer multiple of a native tile height used in the tile-based graphics processing system and the texel's width is an integer multiple of a native tile width used in the tile-based graphics processing system. The rendering phase also comprises, for each tile to be rendered: determining from the fragment density map a fragment size to be used to render the tile, performing sampling using the determined fragment size and performing fragment shading using the determined fragment size.

According to a first aspect, there is provided a method of rendering a frame showing a scene formed by primitives in a tile-based graphics processing system, the method comprising: a geometry processing phase, comprising the step of: tiling the primitives in the scene, to determine which primitives at least partially overlap which tiles of the frame to be rendered; and a rendering phase comprising the steps of: obtaining a fragment density map defining one or more texels, each texel corresponding to an area of the frame to be rendered and having an associated fragment size, wherein for each of the texels, the texel's height is an integer multiple of a native tile height used in the tile-based graphics processing system and the texel's width is an integer multiple of a native tile width used in the tile-based graphics processing system; and for each tile to be rendered: determining from the fragment density map a fragment size to be used to render the tile, performing sampling using the determined fragment size and performing fragment shading using the determined fragment size.

Optionally, tiling the primitives in the scene comprises storing in a memory data for each tile indicating which primitives overlap at least partially with that tile. The rendering phase may comprise, for each tile, retrieving from the memory the data indicating which primitives overlap at least partially with that tile.

Optionally, the native tile height and native tile width are the maximum tile height and maximum tile width, respectively, that the tile-based graphics processing system is configured to process using single sample points as single pixels.

Optionally, performing sampling using the determined fragment size further comprises determining the positions of sample points to be used from the determined fragment size. Determining the positions of sample points may comprise using a stored pattern of sample points and scaling the pattern based on the determined fragment size. The tile-based graphics processing system may be configured to store a plurality of patterns of sample points, each pattern for a different anti-aliasing setting, and using a stored pattern of sample points comprises selecting one of the plurality of patterns based on an anti-aliasing setting to be used to render the frame.

Optionally, the tile-based graphics processing system is configured to use a buffer to store sampling data identifying which primitives are visible at which sample points, the buffer being sized to accommodate a number of samples corresponding to the native tile width and native tile height. Performing fragment shading using the determined fragment size may further comprise determining an active region of the buffer based on the determined fragment size, using the active region to store sampling data and accessing sampling data from only the active region to be used in fragment shading.

According to a second aspect, there is provided a graphics processing system configured to render a frame showing a scene formed by primitives in a tile-based graphics processing system, the system comprising: geometry processing logic, configured to: tile the primitives in the scene, to determine which primitives at least partially overlap which tiles of the frame to be rendered; and rendering logic configured to: obtain a fragment density map defining one or more texels, each texel corresponding to an area of the frame to be rendered and having an associated fragment size, wherein for each of the texels, the texel's height is an integer multiple of a native tile height used in the tile-based graphics processing system and the texel's width is an integer multiple of a native tile width used in the tile-based graphics processing system; and for each tile to be rendered: determine from the fragment density map a fragment size to be used to render the tile, perform sampling using the determined fragment size and perform fragment shading using the determined fragment size.

Optionally, the geometry processing logic configured to tile the primitives in the scene is further configured to store in a memory data for each tile indicating which primitives overlap at least partially with that tile. The rendering logic may be further configured to retrieve, from the memory, for each tile, the data indicating which primitives overlap at least partially with that tile.

Optionally, the native tile height and native tile width are the maximum tile height and maximum tile width, respectively, that the tile-based graphics processing system is configured to process using single sample points as single pixels.

Optionally, the rendering logic configured to perform sampling using the determined fragment size is further configured to determine the positions of sample points to be used from the determined fragment size. The rendering logic configured to determine the positions of sample points may be further configured to use a stored pattern of sample points and to scale the pattern based on the determined fragment size. The tile-based graphics processing system may be configured to store a plurality of patterns of sample points, each pattern for a different anti-aliasing setting, and the rendering logic configured to use a stored pattern of sample points is further configured to select one of the plurality of patterns based on an anti-aliasing setting to be used to render the frame.

Optionally, the tile-based graphics processing system comprises a buffer to store sampling data identifying which primitives are visible at which sample points, the buffer being sized to accommodate a number of samples corresponding to the native tile width and native tile height. The rendering logic configured to perform fragment shading using the determined fragment size may be further configured to determine an active region of the buffer based on the determined fragment size, to use the active region to store sampling data and to access sampling data from only the active region to be used in fragment shading.

According to a third aspect, there is provided a graphics processing system configured to perform the method of any of the aforementioned variations of the second aspect.

The graphics processing system may be embodied in hardware on an integrated circuit. There may be provided a method of manufacturing, at an integrated circuit manufacturing system, a graphics processing system. There may be provided an integrated circuit definition dataset that, when processed in an integrated circuit manufacturing system, configures the system to manufacture a graphics processing system. There may be provided a non-transitory computer readable storage medium having stored thereon a computer readable description of a graphics processing system that, when processed in an integrated circuit manufacturing system, causes the integrated circuit manufacturing system to manufacture an integrated circuit embodying a graphics processing system.

There may be provided an integrated circuit manufacturing system comprising: a non-transitory computer readable storage medium having stored thereon a computer readable description of the graphics processing system; a layout processing system configured to process the computer readable description so as to generate a circuit layout description of an integrated circuit embodying the graphics processing system; and an integrated circuit generation system configured to manufacture the graphics processing system according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
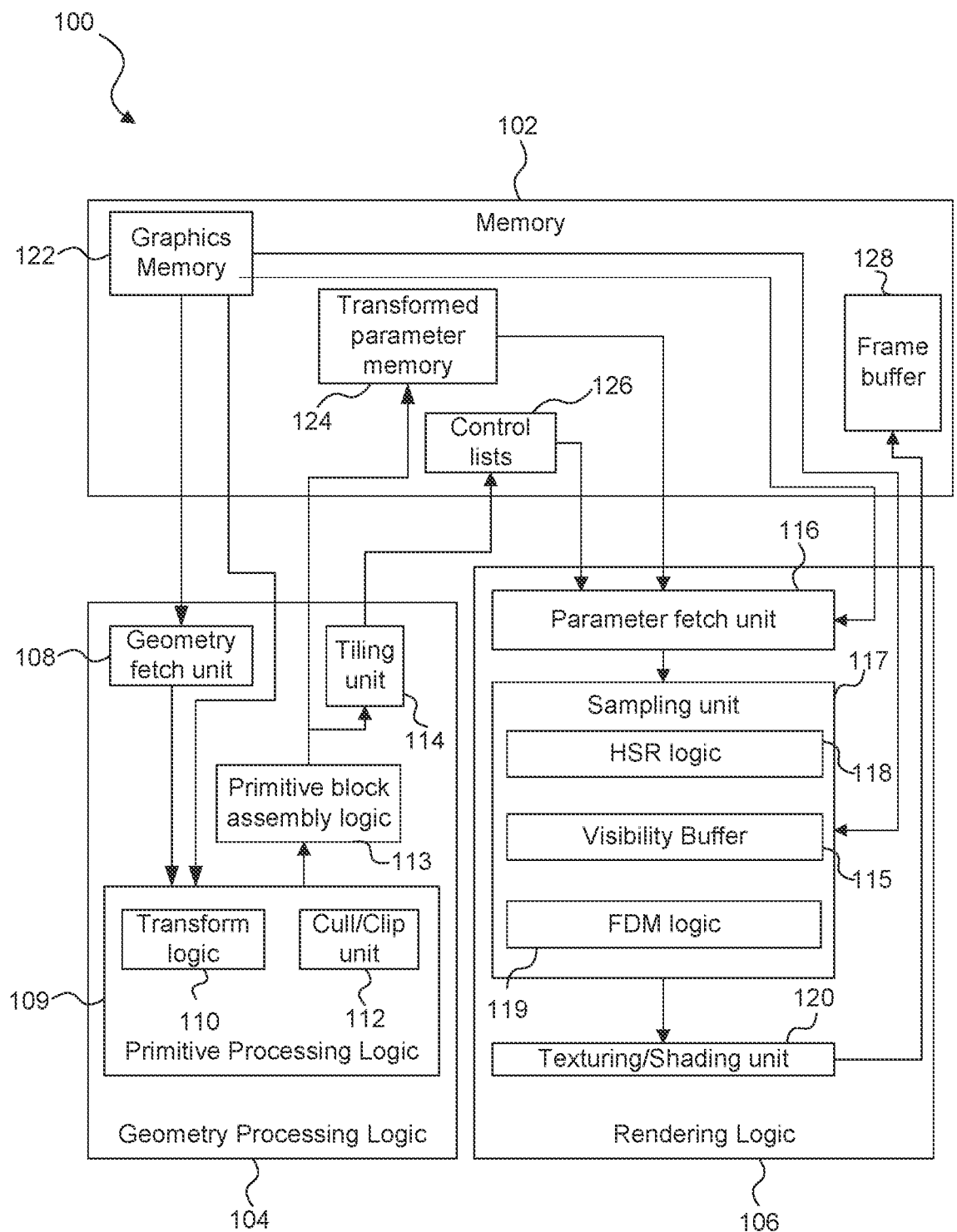
FIG. 1 is a diagram of a graphics processing system.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

The use of different fragment shading rates, as mentioned above, gives greater flexibility in how fragments are shaded by a graphics processing system.

One technique for communicating to the graphics processing system what the rates for shading the fragments should be is itself known as the 'fragment shading rate' technique. In this document the phrase 'fragment shading rate' (and the abbreviation 'FSR') may be used to denote both that particular technique for providing different rates for performing fragment shading, and to denote particular fragment shading rate settings or values. The relevant meaning can be distinguished by the associated use of the terms 'technique' or 'value', as appropriate, but in general the relevant meaning will be clear to the skilled person from the context.

In the FSR technique, the FSR values can be specified to a graphics processing system in a number of ways. One way is to specify FSR values by a 'pipeline' or 'per draw' FSR technique, which associates a particular fragment shading rate value with a particular draw call (and thus for the primitives associated with that draw call). Another way is to specify FSR values by a 'primitive' or 'provoking vertex' FSR technique, which sets a particular fragment shading rate value at a per-primitive granularity. A third way is to specify FSR values by an 'attachment' or 'screen space image' FSR technique, which allows for the fragment shading rate to be specified based on the area of the image being rendered. For example, in the attachment FSR technique the rendering space may be divided into areas, each area (or region) associated with a particular FSR value. The FSR values for the areas of the rendering space may be specified using attachment information defining texels that map to each of the areas of the rendering space, each texel being associated with a FSR value for its corresponding area of the rendering space. Alternatively, a single FSR value may be set for the whole rendering space. However, whatever the method of specifying the FSR values in the FSR technique, a key observation is that the technique does not modify the visibility sampling rate (which may also be termed the coverage rate, or coverage sampling rate) that generates the fragments to be shaded. It allows multiple sampler fragments to be treated as a single shader fragment during shading, but the individual sampler fragments are still generated in the way they would be in the absence of the FSR technique, and they are still ultimately used to determine coverage of the shading result.

Another technique, known as the fragment density map (FDM) technique, shares some similarities with the attachment FSR technique. Again, in this document, the phrase 'fragment density map' (and the abbreviation FDM) may be used to denote both that particular technique for providing different rates for performing fragment shading, and to denote the particular 'map' used in the technique to encode those fragment shading rate settings or values. The relevant meaning can be distinguished by the associated use of the term 'technique' to refer to the technique or by use of terms such as 'a FDM' or 'the FDM' when referring to the map used in the technique, but in general the relevant meaning will be clear to the skilled person from the context.

In the FDM technique, information (which may be termed an attachment by those of skill in the art, and which may take the form of an image) is provided to the graphics processing system that indicates (explicitly or implicitly) the shader fragment size(s) to be used for rendering a frame. This information may be directly referred to as a fragment density map (or FDM). In particular, the FDM may divide the frame into sub-areas, which may be called texels, and may specify a shader fragment size in respect of each texel. As such, a single fragment size could be specified for the whole frame, or different regions of the frame (corresponding to different texels of the attachment) could be specified to use different fragment sizes. In this respect the FDM is similar to the attachment used in the attachment FSR technique. However, in the FDM technique, the FDM is not only used to alter the size of the shader fragments, but it is also used to set the size of the sampler fragments (i.e. it is also used to set the visibility sampling rate). That is, the sampler fragment size is also dictated by the FDM, such that the same fragment size is used for both sampling/coverage and shading (whereas in the FSR technique, different sets of samples are used for shading compared to sampling/coverage). As such, this document does not generally distinguish between sampling/coverage and shader fragments for the purposes of the FDM technique, since they are the same.

General System

FIG. 1 shows an example graphics processing system 100. The example graphics processing system 100 is a tile-based graphics processing system. As mentioned above, a tile-based graphics processing system renders a frame by using a rendering space which is subdivided into a plurality of tiles. The tiles are sections of the rendering space, and may have any suitable shape, but are typically rectangular (where the term "rectangular" includes square). The tile sections within a rendering space are conventionally the same shape and size.

The system 100 comprises a memory 102, geometry processing logic 104 and rendering logic 106. The geometry processing logic 104 and the rendering logic 106 may be implemented on a GPU and may share some processing resources, as is known in the art. The geometry processing logic 104 comprises a geometry fetch unit 108; primitive processing logic 109, which in turn comprises geometry transform logic 110, and a cull/clip unit 112; primitive block assembly logic 113; and a tiling unit 114. The rendering logic 106 comprises a parameter fetch unit 116; a sampling unit 117 comprising hidden surface removal (HSR) logic 118; and a texturing/shading unit 120. The example system 100 is a so-called "deferred rendering" system, because the texturing/shading is performed after the hidden surface removal. However, a tile-based system does not need to be a deferred rendering system, and although the present disclosure uses a tile-based deferred rendering system as an example, the ideas presented are also applicable to non-deferred (known as immediate mode) rendering systems or non-tile-based systems. The memory 102 may be implemented as one or more physical blocks of memory and includes a graphics memory 122; a transformed parameter memory 124; a control lists memory 126; and a frame buffer 128.

Figure 2:
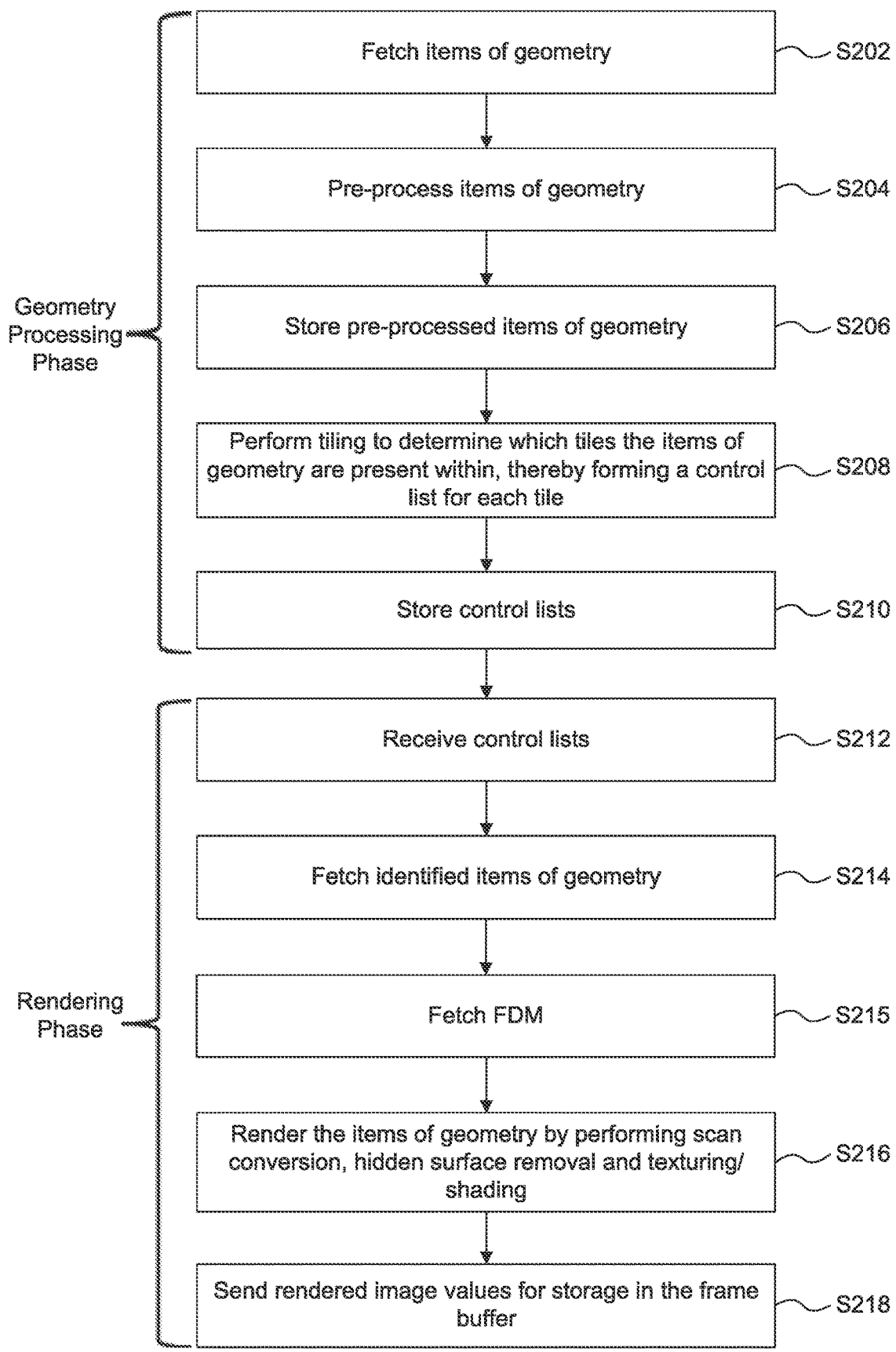
FIG. 2 depicts a method that can be performed by the system of FIG. 1.

FIG. 2 shows a flow chart for a method of operating a tile-based rendering system, such as the system shown in FIG. 1. The geometry processing logic 104 performs the geometry processing phase, in which the geometry fetch unit 108 fetches geometry data (e.g. previously received from an application for which the rendering is being performed) from the graphics memory 122 (in step S202) and passes the fetched data to the primitive processing logic 109. The geometry data comprises graphics data items (i.e. items of geometry) which describe geometry to be rendered. For example, the items of geometry may represent geometric shapes, which describe surfaces of structures in the scene. The items of geometry may be in the form of primitives (commonly triangles, but primitives may be other 2D shapes and may also be lines or points to which a texture can be applied). Primitives can be defined by their vertices, and vertex data can be provided describing the vertices, wherein a combination of vertices describes a primitive (e.g. a triangular primitive is defined by vertex data for three vertices). Objects can be composed of one or more such primitives. In some examples, objects can be composed of many thousands, or even millions of such primitives. Scenes typically contain many objects. Items of geometry can also be meshes (formed from a plurality of primitives, such as quads which comprise two triangular primitives which share one edge). Items of geometry may also be patches, wherein a patch is described by control points, and wherein a patch is tessellated to generate a plurality of tessellated primitives.

In step S204 the geometry processing logic 104 pre-processes the items of geometry, e.g. by transforming the items of geometry into screen space, performing vertex shading, performing geometry shading and/or performing tessellation, as appropriate for the respective items of geometry. In particular, the primitive processing logic 109 (and its sub-units) may operate on the items of geometry, and in doing so may make use of state information retrieved from the graphics memory 122. For example, the transform logic 110 in the primitive processing logic 109 may transform the items of geometry into the rendering space and may apply lighting/attribute processing as is known in the art. The resulting data may be passed to the cull/clip unit 112 which may cull and/or clip any geometry which falls outside of a viewing frustum. The remaining transformed items of geometry (e.g. primitives) are provided from the primitive processing logic 109 to the primitive block assembly logic 113 which groups the items of geometry into blocks, also be referred to as "primitive blocks", for storage. A primitive block is a data structure in which data associated with one or more primitives (e.g. the transformed geometry data related thereto) are stored together. For example, each block may comprise up to N primitives, and up to M vertices, where the values of N and M are an implementation design choice. For example, N might be 24 and M might be 16. Each block can be associated with a block ID such that the blocks can be identified and referenced easily. Primitives often share vertices with other primitives, so storing the vertices for primitives in blocks allows the vertex data to be stored once in the block, wherein multiple primitives in the primitive block can reference the same vertex data in the block. In step S206 the primitive blocks with the transformed geometric data items are provided to the memory 102 for storage in the transformed parameter memory 124. The transformed items of geometry and information regarding how they are packed into the primitive blocks are also provided to the tiling unit 114. In step S208, the tiling unit 114 generates control stream data for each of the tiles of the rendering space, wherein the control stream data for a tile includes a control list of identifiers of transformed primitives which are to be used for rendering the tile, i.e. a list of identifiers of transformed primitives which are positioned at least partially within the tile. The collection of control lists of identifiers of transformed primitives for individual tiles may be referred to as a "control stream list" or "display list". In step S210, the control stream data for the tiles is provided to the memory 102 for storage in the control lists memory 126. Therefore, following the geometry processing phase (i.e. after step S210), the transformed primitives to be rendered are stored in the transformed parameter memory 124 and the control stream data indicating which of the transformed primitives are present in each of the tiles is stored in the control lists memory 126. In other words, for given items of geometry, the geometry processing phase is completed and the results of that phase are stored in memory before the rendering phase begins.

In the rendering phase, the rendering logic 106 renders the items of geometry (primitives) in a tile-by-tile manner. In step S212, the parameter fetch unit 116 receives the control stream data for a tile, and in step S214 the parameter fetch unit 116 fetches the indicated transformed primitives from the transformed parameter memory 124, as indicated by the control stream data for the tile. Step S215 of FIG. 2 will be considered in further detail later. In step S216 the rendering logic 106 renders the fetched primitives by performing sampling on the primitives to determine primitive fragments which represent the primitives at discrete sample points within the tile, and then performing hidden surface removal and texturing/shading on the primitive fragments. In particular, the fetched transformed primitives are provided to the sampling unit 117 (which may also access state information, either from the graphics memory, or stored with the transformed primitives), which performs sampling and determines the primitive fragments to be shaded. As part of determining the primitive fragments to be shaded, the sampling unit 117 uses hidden surface removal (HSR) logic 118 to remove primitive fragments which are hidden (e.g. hidden by other primitive samples). Methods of performing sampling and hidden surface removal are known in the art. The term "fragment" refers to a sample of a primitive at a sampling point, which is to be shaded to assist with determining how to render a pixel of an image (N.B. with anti-aliasing, multiple samples might be shaded to determine how to render a single pixel). The term "sampling" is used herein to describe the process of generating discrete fragments (sampler fragments) from items of geometry (e.g. primitives), but this process can sometimes be referred to as "rasterisation" or "scan conversion". As mentioned above, the system 100 of FIG. 1 is a deferred rendering system, and so the hidden surface removal is performed before the texturing/shading. However, other systems may render fragments before performing hidden surface removal to determine which fragments are visible in the scene.

Fragments which are not removed by the HSR logic 118 are provided from the sampling unit 117 to the texturing/shading unit 120, where texturing and/or shading is applied.

The texturing/shading unit 120 is typically configured to efficiently process multiple fragments in parallel. This can be done by determining individual fragments that require the same processing (e.g. need to run the same shader) and treating them as instances of the same task, which are then run in parallel, in a SIMD (single instruction, multiple data) processor for example.

Although it is not shown in FIG. 1, the texturing/shading unit 120 may receive texture data from the memory 102 in order to apply texturing to the primitive fragments, as is known in the art. The texturing/shading unit 120 may apply further processing to the primitive fragments (e.g. alpha blending and other processes), as is known in the art in order to determine rendered pixel values of an image. The rendering phase is performed for each of the tiles, such that a whole frame can be rendered with pixel values for the whole image being determined. In step S218, the rendered pixel values are provided to the memory 102 for storage in the frame buffer 128. The rendered frame can then be used in any suitable manner, e.g. displayed on a display, or stored in memory or transmitted to another device, etc.

Interaction of FDM with General System

Figure 3:
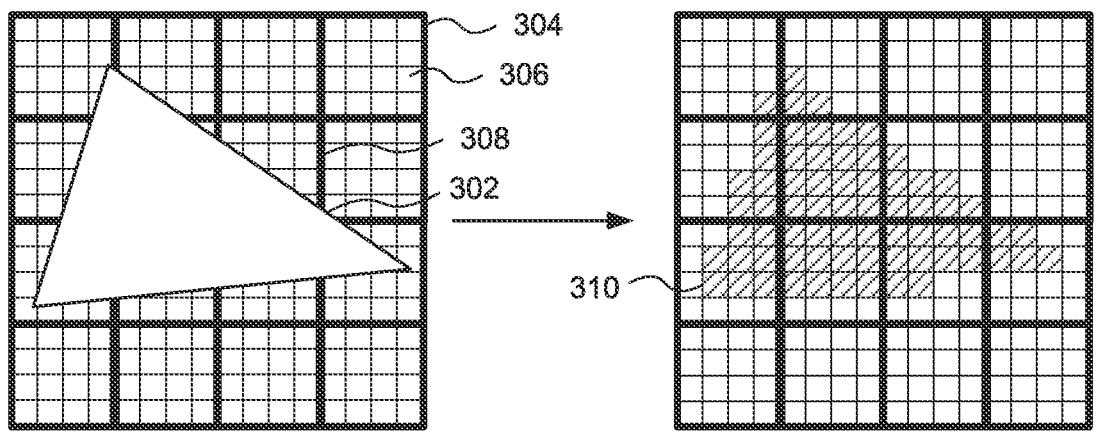
FIG. 3 shows an example of how a primitive may be converted to fragments of a first size.
Figure 4:
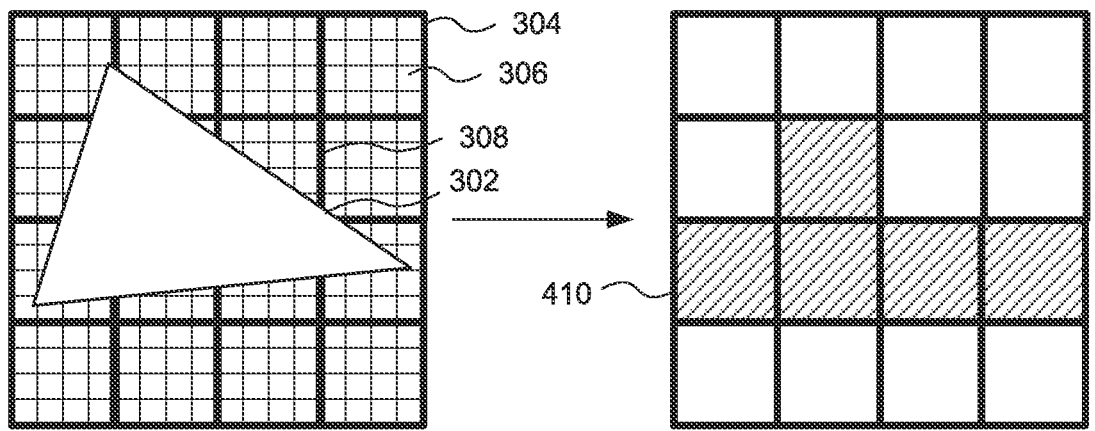
FIG. 4 shows an example of how a primitive may be converted to fragments of a second size.
Figure 5:
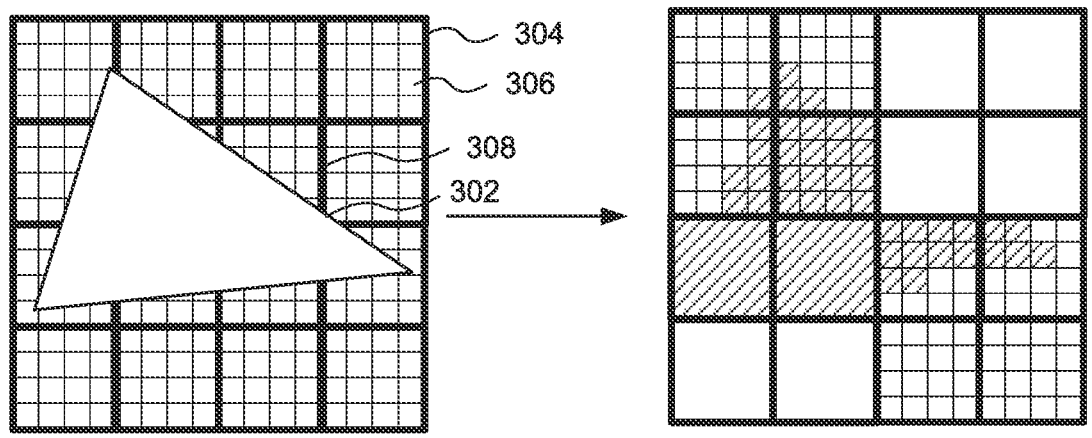
FIG. 5 shows an example of how a primitive may be converted to a mix of fragments of first and second sizes.

FIGS. 3 to 5 illustrate how the FDM technique can affect the rendering of a frame.

The left hand side of FIG. 3 shows a primitive triangle 302 to be rendered in a render space 304. The render space is divided into a grid of small squares 306 corresponding to a first density of sampling points (for the sake of this example, it is assumed that the sampling points are at the centre of the squares), and a grid of larger squares 308 (depicted with thicker lines for ease of distinction) corresponding to a second density of sampling points. In this example, the second density of sampling points is a lower density than the first density, meaning there are fewer sampling points in the same area.

The right hand side of FIG. 3 shows the result of sampling the entire triangle 302 at the first sampling density (the boxes showing the second sampling density are shown for assisting comparison to FIGS. 4 and 5 but are not directly relevant to the sampling result shown in FIG. 3). The shaded small squares 310 correspond to the sampling points that the triangle 302 is found to cover (noting again that the sampling points correspond to the centre of the small squares).

FIG. 4 is similar to FIG. 3, but the right hand side shows the result of sampling the entire triangle 302 at the second sampling density. The shaded large squares 410 correspond to the sampling points that the triangle 302 is found to cover (noting that in this case the sampling points correspond to the centre of the large squares). As can be seen by comparing the right hand sides of FIGS. 3 and 4, sampling at the different sampling densities produces quite different results, with the second (lower) sampling density resulting in a cruder approximation of the triangle 302 than the first (higher) sampling density. However, the lower sampling density requires only five sample points to represent the triangle, in comparison to 69 sample points for the higher sampling rate. Assuming (in contrast to FSR techniques) that each sample point is individually shaded, it can be immediately understood that there will be a lot more processing work required to sample and shade at the higher sampling density.

It can therefore be understood from FIGS. 3 and 4 that using different sampling rates can change the quality with which the original primitives are reproduced, but with increased quality being associated with increased processing work.

The FDM technique allows different sampling rates to be used within different areas of the same image. This is illustrated in FIG. 5, which represents a situation in which an FDM specifies a texel size corresponding to the larger squares 308. The right hand side shows the result of the texels in the upper left and lower right quadrants of the render space 304 specifying the first (higher) sampling density and the texels in the upper right and lower left quadrants of the render space 304 specifying the second (lower) sampling density. In this example, this results in different parts of the triangle 302 being sampled (and thus ultimately rendered) at different resolutions. More generally, this technique could be utilised to render more visually important areas of a scene with greater detail, whilst saving processing power by rendering less important areas at lower resolutions.

However, implementing the FDM technique presents challenges, particularly in a tile-based graphics processing system. In a tile-based system, different tiles are rendered separately, and the results of each rendered tile are then combined to form the overall rendered frame. Such systems are optimised for determining which geometry falls into which tiles, and then rendering each tile based on a given set of rendering parameters, to make best use of the on-chip resources such as memory and buffers. In particular, a tile-based rendering system will be configured to operate with a particular 'native' tile size. In this context 'native' denotes the tile size in pixels when a single sample point corresponds to a single pixel in the rendered output. That is, it is the maximum tile height and maximum tile width that the tile-based graphics processing system is configured to process using single sample points as single pixels. For example a native tile size of 32×32 sample points would correspond to 32×32 pixels in the absence of anti-aliasing. In contrast, anti-aliasing may result in several sample points being used to render a single fragment, and in that case the pixel area represented by the tile may differ from the 'native' pixel size whilst still being derived from 32×32 sample points (moreover, as will become apparent below, FDM techniques may result in a tile that does not even use the native number of sample points). The hardware for implementing such systems will thus be provided with particular memories and buffers, e.g. a tile buffer for storing the render results for the tile (not shown in FIG. 1), or a visibility buffer (element 115 in FIG. 1, discussed further below) for tracking which primitives are visible at a particular sample location within the tile, with those memories and buffers being sized based on that native tile size. The hardware may thus expect, for example, to read a sequence of known memory locations and be retrieving a sequence of values for known (relative) sample positions within the tile. In the context of the FDM technique this is problematic, because there is no longer a guaranteed uniform sequence of sample positions. For example, considering the right hand side of FIG. 3, the system may be configured to expect to encounter sampling results in the buffer in an order that corresponds to a raster order, line-by-line and left-to-right, knowing that each line is 16 (small) samples long and also knowing that there are 16 lines (N.B. the read order need not be a raster order like this, but may e.g. be a Morton, Z, or boustrophedon order—in each case the important point is that the there is an expected/predetermined correspondence between the memory locations and the position within the tile). When moving to the FIG. 4 scenario, the system will now only be producing 4 sampling results per line (and only 4 lines of sampling results), which will not be consistent with the system's configured expectations. In the FIG. 5 scenario it is no longer possible to even easily consider a 'line' of sampling results, because the different size fragments do not conform to that preconceived layout. Indeed, a scenario could be more complicated than FIG. 5. FIG. 5 could be considered to have a relatively regular layout of different regions of different sample density, because each row of texels/larger squares 308 has two texels sampled at the higher rate and two sampled at the lower rate. However, the arrangement of different sample densities within the texels may effectively be random (and is not limited to just two different values). This all makes it problematic to store the data in a way that can be correctly understood at the rendering stage.

Moreover, it has been appreciated that the FDM technique is one that is intended to simplify the processing load for rendering a scene. As such, it does not make practical sense to design more computationally complex systems to cope with the technique. Instead, it has been determined that the FDM technique can be implemented by constraining the minimum FDM texel size to be the native tile size of the graphics processing system. Since FDM texel sizes are typically square, doubling in height and width from one to another (e.g. 32×32, 64×64, 128×128, 256×256), this constraint on the minimum can be enough to guarantee that each tile will only be covered by a single FDM texel and thus sampled at a single sampling density. That is, more generally, the FDM texel sizes are effectively constrained to have heights and widths that are an integer number of times the native tile height and width used by the graphics system. This allows the processing within a single tile to be performed with a uniform fragment size, whilst still allowing variation in fragment size/sample density over the frame as a whole (i.e. different tiles may be rendered with different sampling densities as a result of the FDM).

Returning to the system of FIG. 1, it was previously described that fetched transformed primitives are provided to the sampling unit 117 which performs the sampling and determines the primitive fragments to be shaded. As part of determining the primitive fragments to be shaded, the sampling unit 117 removes primitive fragments which are hidden (e.g. hidden by other primitive fragments). Primitive fragments which are not removed by the HSR logic 118 of the sampling unit 117 are provided to the texturing/shading unit 120, which applies texturing and/or shading to primitive fragments.

The FDM provided by the application provides information about the size and arrangement of FDM texels in the frame to be rendered, and information about the fragment size to be used within each texel. The fragment size may be specified indirectly, in terms of sample density values (in two dimensions, represented (Cx,Cy)) for a particular texel. Accordingly, the fragment size information may be derived by inverting the density values. For example, a density value specified as (1, 0.5) corresponds to a fragment area of (1/1, 1/0.5) or (1, 2) (i.e. 1×2 pixels.

As such, to incorporate the FDM technique, and as shown at step S215 of FIG. 2, the parameter fetch unit 116 also retrieves the FDM from the graphics memory 122, as shown in FIG. 1. Although this step is shown after the steps of receiving the control lists and fetching the geometry in FIG. 2, it will be understood that fetching the FDM is independent of those other steps, and so may happen before them or in parallel with them. The parameter fetch unit 116 then uses the FDM to pass fragment size information to the sampling unit 117 (along with the control stream data and transformed primitives indicated by the control stream data, as previously described), as part of step S216 in FIG. 2. The sampling unit 117 contains FDM logic 119. The FDM logic 119 is configured to control the sampling of the primitives based on the information from the FDM.

In this arrangement, it is convenient for the parameter fetch unit 116 to determine the position of the tile being processed in the frame with respect to the FDM, and thus determine the FDM texel that the tile being processed falls within and the associated fragment size information. The parameter fetch unit 116 may process that information (if required, e.g. if the information is a sample density value as discussed above) to calculate the FDM fragment size to use for the tile and then pass that FDM fragment size to the sampling unit 117. The skilled person will understand that determining the position of a tile within the frame is part of the ordinary function of the rendering logic 119 (as it is necessary to arrange individually rendered tiles into the full frame), and so that is not discussed in detail here.

This arrangement, of having the parameter fetch unit 116 retrieve the FDM and calculate the FDM fragment size, if necessary, whilst it is the sampling unit 117 that utilises the information from the FDM, may seem unintuitive. That is, it might be assumed that it would be preferable for the sampling unit 117 to directly retrieve and process the FDM itself. However, the described arrangement takes advantage of the fact that the sampling unit 117 may itself contain multiple parallel processing units or pipelines. That is, it would be inefficient for each of the parallel pipelines within the sampling unit 117 to separately fetch and process the required FDM information, as this could result in the same FDM being read from the memory multiple times. In particular, due to the constraints imposed on the system such that a given tile will only ever fall within a single FDM texel, it is unnecessary for the sampling unit to have all the information contained in the FDM (it only needs the fragment size for the corresponding the texel). As a result, a naïve implementation of the sampling unit retrieving the FDM could result in each pipeline processing the whole FDM to retrieve the same fragment size. On the other hand, the sampling unit 117 is already configured to handle sampling the geometry, and so can efficiently incorporate the additional considerations introduced by the FDM. In contrast, the parameter fetch unit 116 can retrieve the FDM and provide the FDM information to all the pipelines within the sampling unit 117 at once, but is not configured to handle geometry sampling and so it would not be efficient to adapt that unit to further make use of the FDM values. As such, the described arrangement is the most efficient way of handling the FDM information. In other words, it is advantageous for the rendering logic 106 to use the information in the FDM multiple times based on a single retrieval of the FDM from the graphics memory 122. Still, in other implementations the FDM may be retrieved by a different element in the pipeline (and thus step S215 in FIG. 2 may be performed by a different element in the pipeline). For example, were the sampling unit 117 to be configured to retrieve the FDM information directly, an efficient implementation would be to process the FDM once within the sampling unit 117 to determine the fragment size and provide that fragment size to each of the pipelines (although this would likely require more significant changes to existing systems than the main example proposed above).

Figure 10:
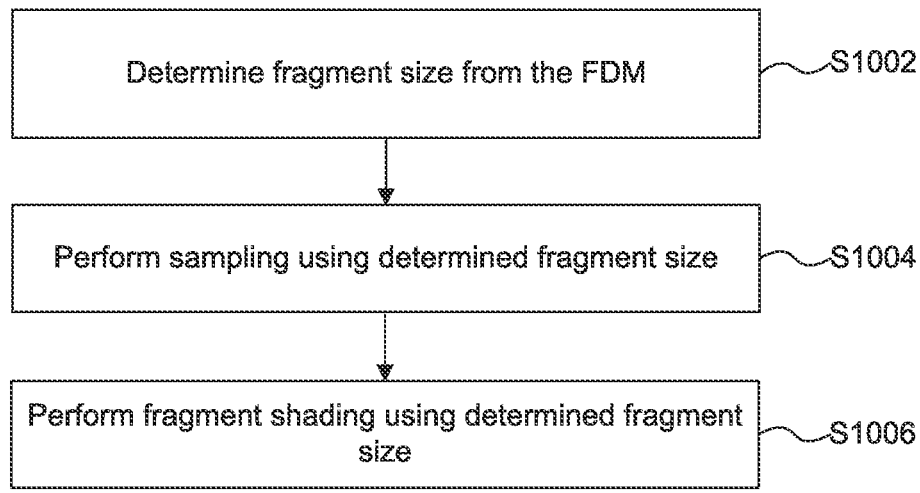
FIG. 10 depicts a method related to sampling and shading dependent on the fragment size.

As such, FIG. 10 shows additional detail of some of the stages involved in step S216 of FIG. 2, for each tile, based on the forgoing discussion. At step S1002 the fragment size is determined from the FDM. As discussed, this could be performed by the parameter fetch unit 116 in the example system, but may be performed by the sampling unit 117 in other systems. At step S1004, the determined fragment size is used to perform the sampling. In the example system this would be performed by sampling unit 117. At step S1006, fragment shading is performed using the results of the sampling and the predetermined fragment size.

As mentioned above, the FDM indicates the arrangement and size of texels within the frame. Example texel sizes may be 32×32, 64×64, 128×128 and 256×256 pixels, although other values may be used—as already discussed, the particular values available will depend on the system and the lower size limit will be constrained by the system's native tile size. Considering a system with a minimum FDM texel size of 32×32 and a native tile size of 32×32 pixels, it can be understood that there may be multiple tiles that map to a single FDM texel.

Moreover, the system may also be utilising anti-aliasing, such that an actual tile being processed represents fewer than 32×32 pixels. For example. A 2×AA (anti-aliasing) mode may result in two samples being stored per pixel. A system configured to natively store 32×32 sampling results for a tile will thus only be able to store the sampling results for 32×16 (or 16×32, depending on how the sampling occurs/is stored) pixels, even though that will result in 32×32 samples being stored. Similarly 4×AA mode may result in four samples being stored per pixel and thus a tile will correspond to 16×16 pixels if the native tile size is 32×32 pixels.

Figure 6:
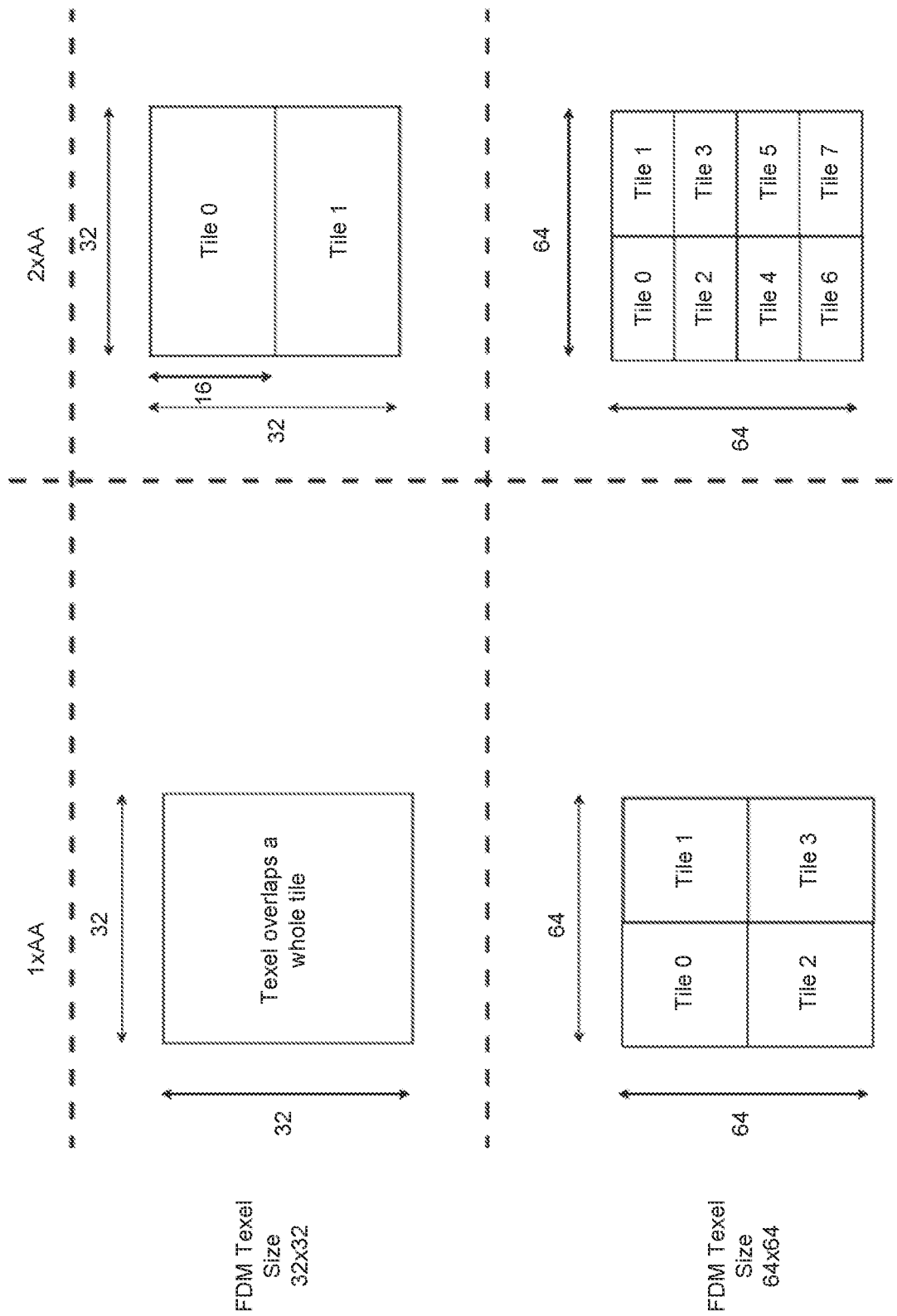
FIG. 6 illustrates how fragment density map texel size and anti-aliasing interact with respect to tiles in a tile-based graphics processing system.

FIG. 6 illustrates this point, showing a table of how FDM texels and tiles relate for two different FDM texel sizes (32×32 on the top row, 64×64 on the bottom row) and two different anti-aliasing modes (1×AA—i.e. no anti-aliasing—on the left, 2×AA on the right). The 1×AA and 32×32 FDM texel size corresponds to a native tile size matching the FDM texel size, such that the texel overlaps the whole tile. Increasing to 2×AA, but keeping the same FDM texel size of 32×32 causes two tiles (denoted Tile 0 and Tile 1) to fit within the one FDM texel. In this example, the 2×AA causes two samples to be stored in the Y direction (i.e. up/down direction of FIG. 6) meaning that each tile only stores 16 pixels in the Y direction, but can still store 32 pixels in the X direction. On the second row, the 1×AA and 64×64 FDM texel size scenario shows that four native tiles (denoted Tile 0 to Tile 3) fit within one FDM texel. Increasing to 2×AA, but keeping the same FDM texel size of 64×64 causes two tiles to fit within the same pixel space as each one of the tiles in the 1×AA scenario, resulting in eight tiles (denoted Tile 0 to Tile 7) in the area of the 64×64 FDM texel.

Figure 7:
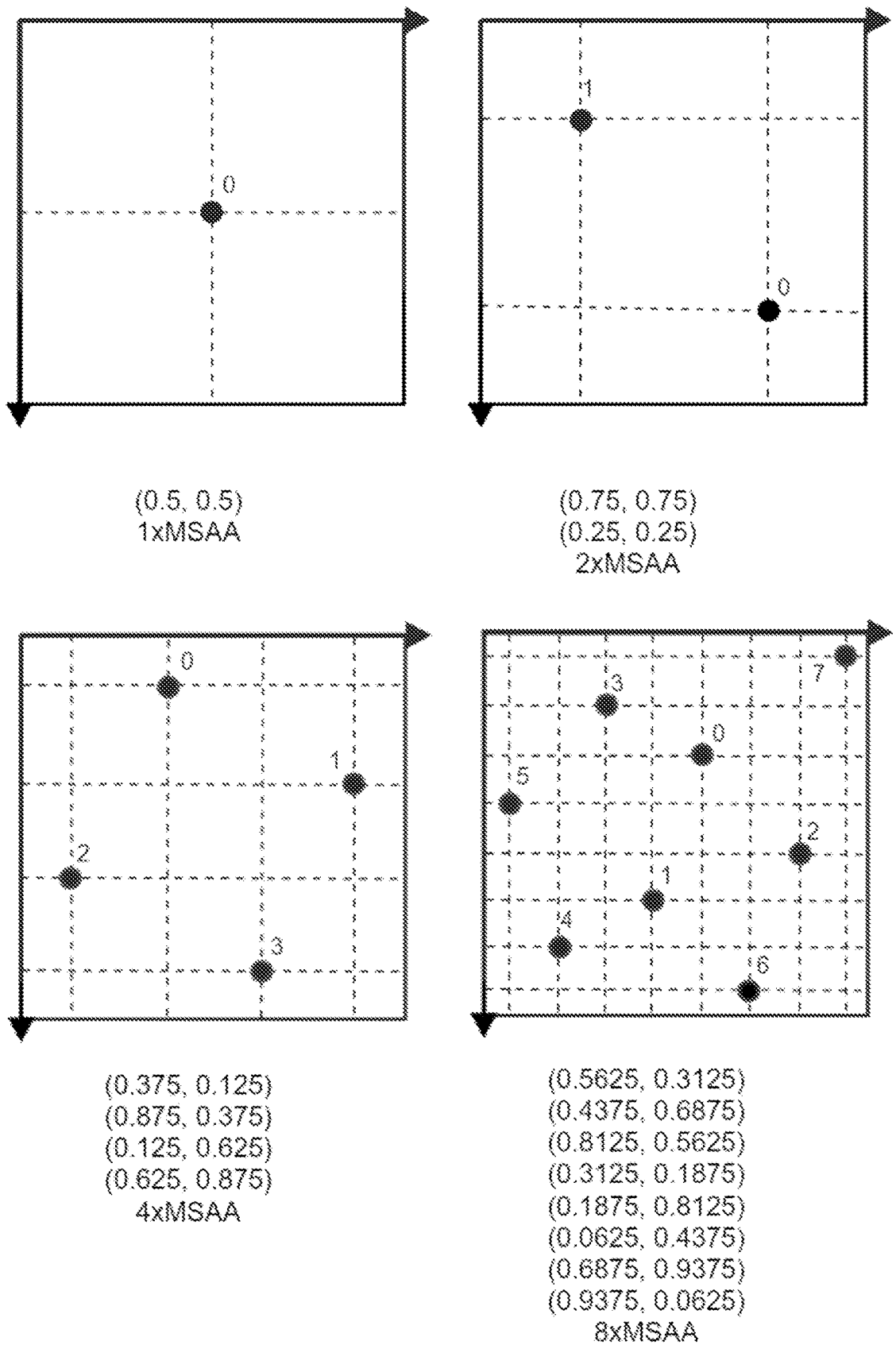
FIG. 7 illustrates different sampling patterns for different modes of multi-sample antialiasing.

Conventionally, a graphics processing system may store the sampling patterns to use for a particular anti-aliasing mode. These may be stored, for example, in configuration registers, but in general should be stored in a location accessible by the sampling unit (and more generally the rendering logic as a whole). FIG. 7 shows some sampling patterns for a multisampling anti-aliasing (MSAA) scheme. For example, the top left pattern for a 1×MSAA mode shows that a single sample point (indexed 0) is positioned at the centre of the fragment being sampled, and underneath the pattern the location of that sample point is indicated as coordinates along the depicted axes. Similarly, the bottom right pattern is for a 8×MSAA mode and shows that eight sample points (indexed 0 to 7) are positioned throughout the fragment being sampled, and underneath the pattern the location of those sample points are indicated as coordinates along the depicted axes (listed top-to-bottom for indices 0 to 7)

The sampling patterns shown in FIG. 7 assume a fixed fragment size. However, fragments in a system using the FDM technique have only one set of sample points per fragment. That is, the same set of sample points are used in respect of visibility sampling and for fragment shading and those fragments can be of different pixel sizes. That differs from the FSR technique, for example, in which there is one set of coverage sample points per pixel, even if multiple pixels are shaded together as a single fragment.

One option to handle this situation could be to have the system store sampling patterns for different combinations of anti-aliasing mode and FDM texel size. However, that not only requires increased storage provision (for sampling patterns that would not be used when the FDM technique was not in use), but would also require introducing further selection logic into the system to enable the correct sampling pattern to be chosen.

Instead, preferred embodiments of the system use the same conventional sampling patterns as would be used in the absence of the FDM technique, but the sampling unit 117 is provided with additional FDM logic 119 (shown in FIG. 1) that is configured to scale the sampling patterns as appropriate. In this way, the sampling is performed using the determined fragment size to determine the positions of sample points to be used (i.e. the positions of the sample points to be used are determined from the determined fragment size). This is achieved by scaling the stored pattern of sample points based on the determined fragment size.

Figure 8:
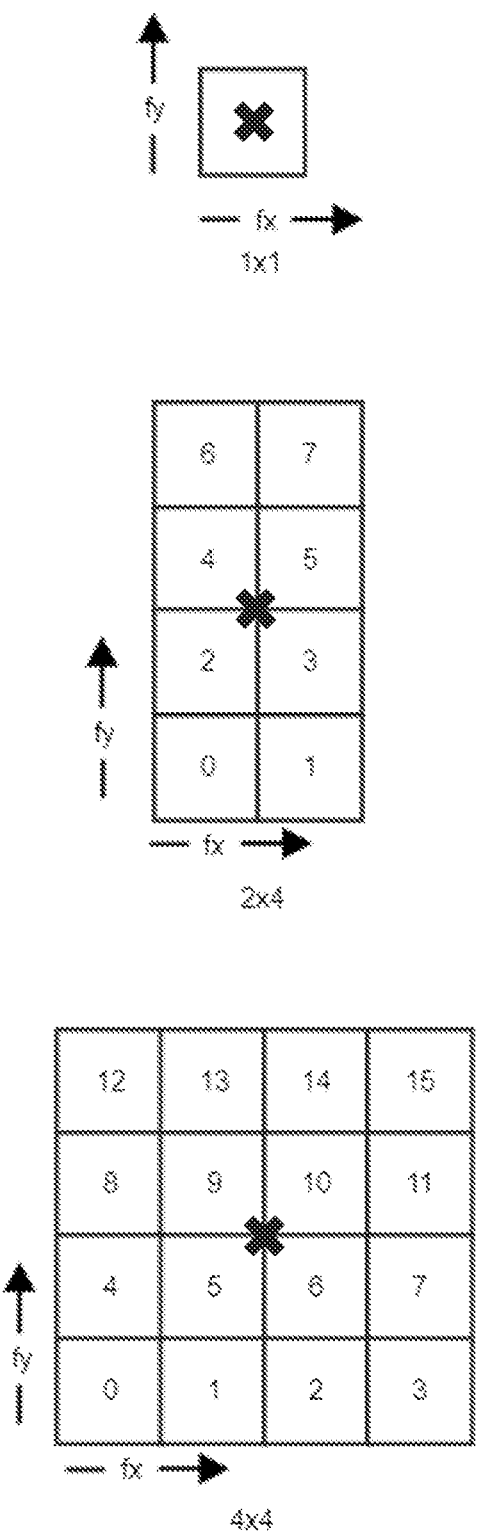
FIG. 8 illustrates the scaling of a sampling pattern to different fragment sizes.

For example, FIG. 8 illustrates how a sampling pattern for a 1×AA mode can be scaled to different fragment sizes. The top part of FIG. 8 illustrates the conventional situation of how the sampling pattern (a single sample point, denoted by an 'x' symbol) is applied to a 1×1 fragment (i.e. a fragment corresponding to 1 pixel). In accordance with what is shown in FIG. 7, the sampling point is in the centre of the single pixel, halfway along the X axis of the pixel and halfway along the Y axis of the pixel—i.e. it is at pixel coordinates (0.5, 0.5). The middle part of FIG. 8 illustrates how that same sampling pattern is properly applied to a fragment of size 2×4 pixels (indexed 0 to 7 in the Figure). In this case, if the sample point had been positioned at (0.5, 0.5), as for the conventional situation, the sampling result would be wrong (representing the centre of pixel 0). Instead, by scaling the conventional pixel coordinate point (0.5, 0.5) by the fragment size—2 pixels in the X direction, 4 pixels in the Y direction—the sampling pixel coordinate point is moved to (1, 2). In other words, the conventional coordinates are multiplied by the size of the fragment for the corresponding axis. By doing this, the same sampling pattern (i.e. the stored coordinate (0.5, 0.5)) can be used to determine the sampling coordinates for the different fragment size. Similarly, for the bottom scenario in FIG. 8, the fragment size is 4×4, and the correct sampling point location can be derived by multiplying the coordinates for the 1×1 fragment size by the increased fragment dimensions to give (0.5×4, 0.5×4)=(2, 2).

Figure 11:
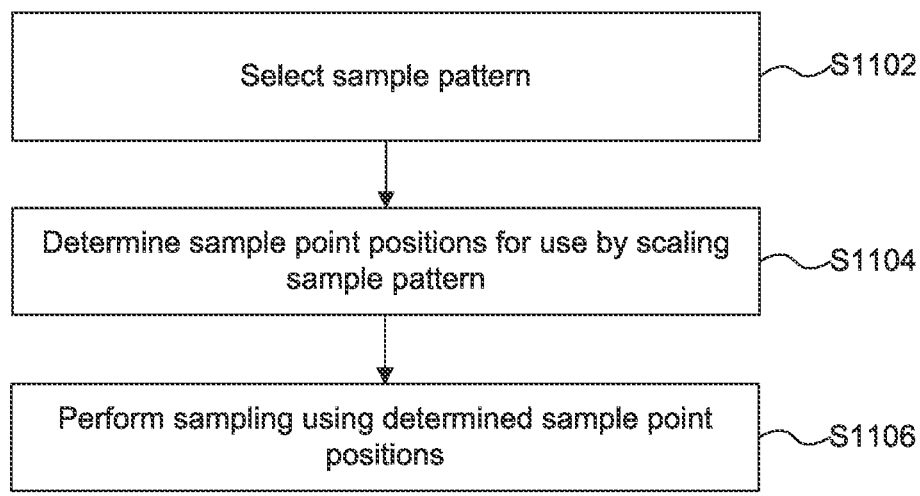
FIG. 11 depicts a method related to scaling a sample patter dependent on the fragment size.

Returning to FIG. 1, the FDM logic 119 is therefore configured to receive the fragment size and the sampling pattern (e.g. the coordinates of the samples points) associated with sampling a single pixel at the required anti-aliasing mode, and to scale the sampling pattern according to the fragment size. That is, the FDM logic 119 can be configured to multiply the coordinates of the sampling pattern by the size of the corresponding dimensions of the fragment size, to produce a scaled sampling pattern. That scaled sampling pattern can then be used by the sampling unit 117 as it normally would. This process is summarised in FIG. 11, which provides additional detail regarding some of the stages in step S1004 of FIG. 10. In step S1102, the sampling unit 117 selects one of the plurality of patterns stored by the system. Each pattern is for a different anti-aliasing setting, and so the selection is based upon the anti-aliasing setting to be used to render the frame. At step S1104 the sample point positions to be used during sampling are determined. They are determined by scaling the positions of the sample points in the selected sample pattern, based on the fragment size. At step S1106, sampling for the tile is performed using the determined sample point positions.

Another problem with using variable sized fragments for coverage/sampling, hinted at above when discussing FIGS. 3 to 5, is that the sampling results for a tile may not make full use of the memories and buffers. In particular, a visibility buffer (reference 115 in FIG. 1) is provided in the sampling unit 117 for tracking which primitives are visible at a particular sample location within the tile. However, the visibility buffer 115 is sized to store indications of which primitives are visible for a tile of the native tile size. This is not adversely affected by conventional techniques such as anti-aliasing, which change the number of samples per pixel, because those can be taken into account when determining the tile size (i.e. in advance of the sampling), such that the tile remains the same size in samples even if it covers a different number of pixels. However, with the FDM technique the fragment size that controls both the coverage and the shading is not known until the point of sampling, and so the system must allow for the smallest fragment size when determining the tile size.

Figure 9:
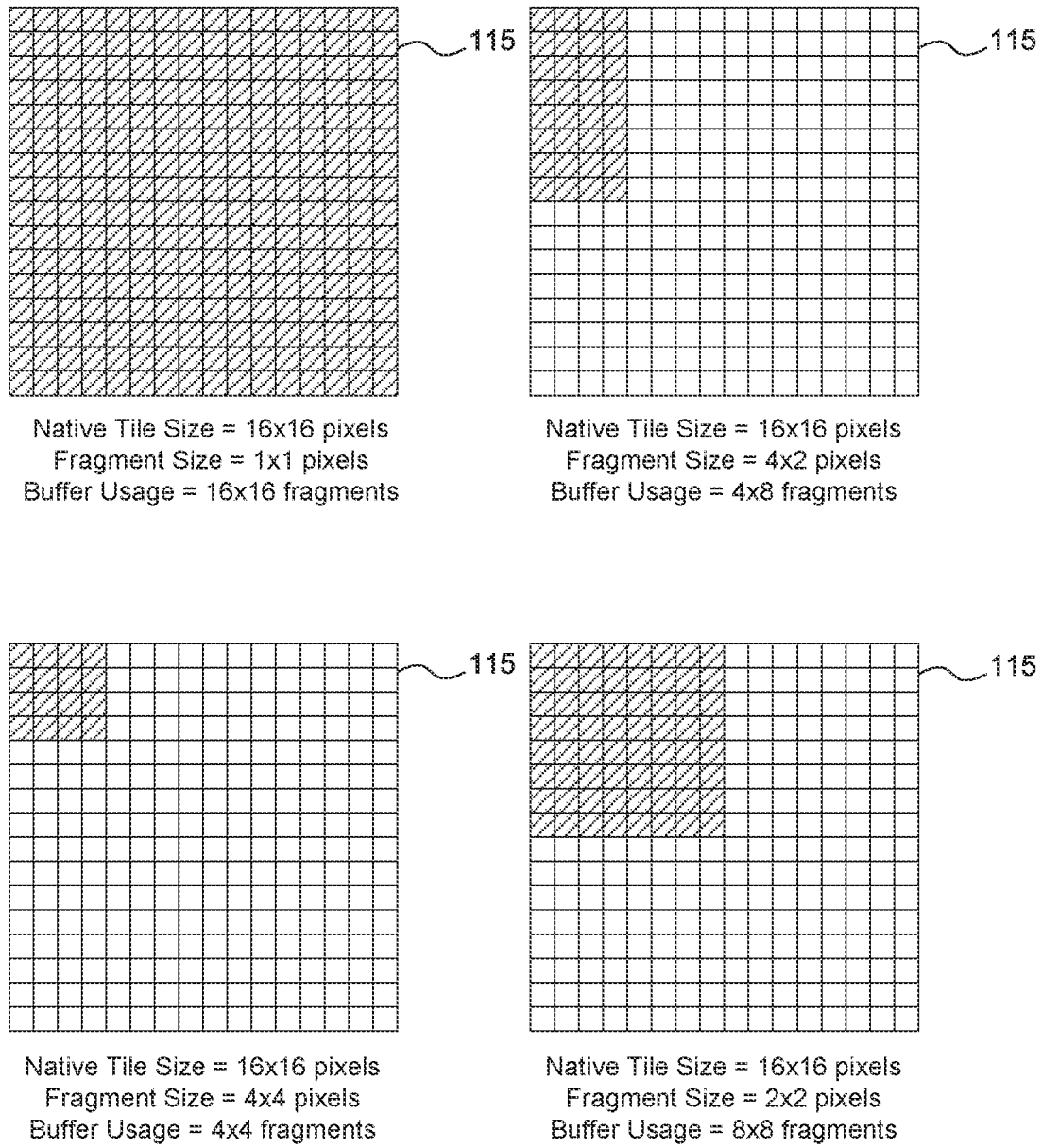
FIG. 9 illustrates differing usage of a buffer for different fragment sizes.

This is illustrated in FIG. 9, which shows four examples of how a visibility buffer 115 is used depending on the fragment size. In these examples the native tile size is 16×16 pixels. In the top left example, the fragment size is 1×1 pixels, so each position in the visibility buffer 115 is used/corresponds to a fragment (represented by hatched shading). In the top right example, the fragment size is 4×2 pixels, which means the 16×16 pixel tile area contains only 4×8 fragments and so the visibility buffer 115 only contains results for 4×8 fragments. In the bottom left example, the fragment size is 4×4 pixels, which means the 16×16 pixel tile area contains only 4×4 fragments and so the visibility buffer 115 only contains results for 4×4 fragments. In the top right example, the fragment size is 2×2 pixels, which means the 16×16 pixel tile area contains only 8×8 fragments and so the visibility buffer 115 only contains results for 8×8 fragments.

In the absence of any other provision, a partially used visibility buffer could cause problems for the later shading and rendering. Later stages of the render logic would be configured to expect the complete buffer to be used, and so would try to retrieve data from areas of the buffer that do not contain valid data (e.g. perhaps data from rendering a previous tile that did use the entire buffer). To avoid this, the present arrangement saves the data for the valid fragments into a predetermined area/memory locations of the buffer (visually depicted as the top left corner of the buffer in the example of FIG. 9). The actual area of the buffer used will depend on the fragment size, but the relevant area can be determined from the fragment size. For example, in the visual representation, it will be a region in the top left corner with a width of 'native tile width divided by fragment width' and a height of 'native tile height divided by fragment height'. Thus, having determined the 'valid' or 'active' region of the buffer using the fragment size, the active region can be used to store the sampling data (i.e. the results of sampling) and that data can be accessed by the rendering logic 106 by using the fragment size to determine the 'active' region of the buffer and to only retrieve data from that region.

Figure 12:
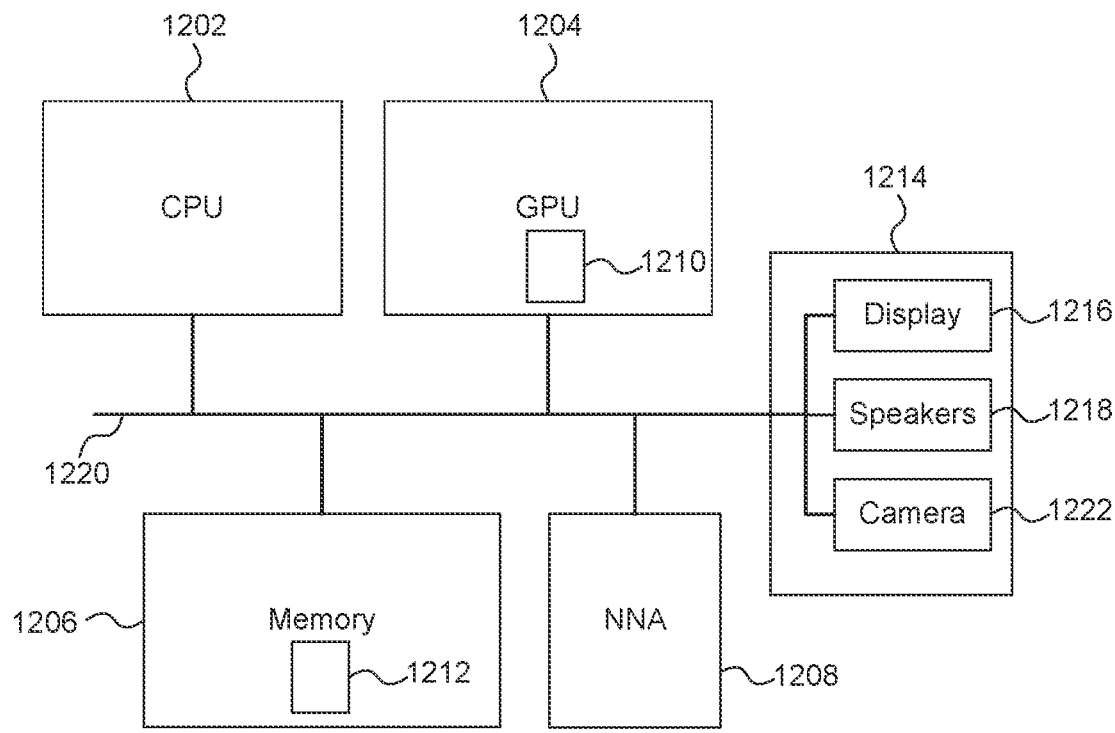
FIG. 12 shows a computer system in which a graphics processing system is implemented.

FIG. 12 shows a heterogeneous computing system in which the graphics processing systems described herein may be implemented. The computer system comprises a CPU 1202, a GPU 1204, a memory 1206, a neural network accelerator (NNA) 1208 and other devices 1214, such as a display 1216, speakers 1218 and a camera 1222. One or more processing blocks 1210 (e.g. corresponding to processing blocks 104 or 106) may be implemented on the GPU 1204. In other examples, one or more of the depicted components may be omitted from the system, and/or the processing block 1210 may be implemented on the CPU 1202 or within the NNA 1208. The components of the computer system can communicate with each other via a communications bus 1220. A store 1212 (corresponding to store 102) is implemented as part of the memory 1206.

The graphics processing system of FIG. 1 is shown as comprising a number of functional blocks. This is schematic only and is not intended to define a strict division between different logic elements of such entities. Each functional block may be provided in any suitable manner. It is to be understood that intermediate values described herein as being formed by a graphics processing system need not be physically generated by the graphics processing system at any point and may merely represent logical values which conveniently describe the processing performed by the graphics processing system between its input and output.

The graphics processing systems described herein may be embodied in hardware on an integrated circuit. The graphics processing systems described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be or comprise any kind of general purpose or dedicated processor, such as a CPU, GPU, NNA, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a graphics processing system configured to perform any of the methods described herein, or to manufacture a graphics processing system comprising any apparatus described herein. An integrated circuit definition dataset may be, for example, an integrated circuit description.

Therefore, there may be provided a method of manufacturing, at an integrated circuit manufacturing system, a graphics processing system as described herein. Furthermore, there may be provided an integrated circuit definition dataset that, when processed in an integrated circuit manufacturing system, causes the method of manufacturing a graphics processing system to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a graphics processing system will now be described with respect to FIG. 13.

Figure 13:
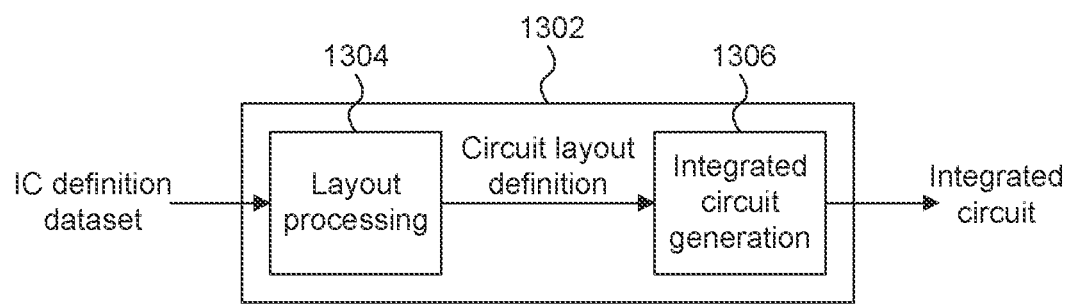
FIG. 13 shows an integrated circuit manufacturing system for generating an integrated circuit embodying a graphics processing system.

FIG. 13 shows an example of an integrated circuit (IC) manufacturing system 1002 which is configured to manufacture a graphics processing system as described in any of the examples herein. In particular, the IC manufacturing system 1302 comprises a layout processing system 1304 and an integrated circuit generation system 1306. The IC manufacturing system 1302 is configured to receive an IC definition dataset (e.g. defining a graphics processing system as described in any of the examples herein), process the IC definition dataset, and generate an IC according to the IC definition dataset (e.g. which embodies a graphics processing system as described in any of the examples herein). The processing of the IC definition dataset configures the IC manufacturing system 1302 to manufacture an integrated circuit embodying a graphics processing system as described in any of the examples herein.

The layout processing system 1304 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1304 has determined the circuit layout it may output a circuit layout definition to the IC generation system 1306. A circuit layout definition may be, for example, a circuit layout description.

The IC generation system 1306 generates an IC according to the circuit layout definition, as is known in the art. For example, the IC generation system 1306 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1306 may be in the form of computer-readable code which the IC generation system 1306 can use to form a suitable mask for use in generating an IC.

The different processes performed by the IC manufacturing system 1302 may be implemented all in one location, e.g. by one party. Alternatively, the IC manufacturing system 1302 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a graphics processing system without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 13 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 13, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A method of rendering a frame showing a scene formed by primitives in a tile-based graphics processing system, the method comprising:
 a geometry processing phase, comprising the step of:
  tiling the primitives in the scene, to determine which primitives at least partially overlap which tiles of the frame to be rendered; and
 a rendering phase comprising the steps of:
  obtaining a fragment density map defining one or more texels, each texel corresponding to an area of the frame to be rendered and having an associated fragment size, wherein for each of the texels, the texel's height is an integer multiple of a native tile height used in the tile-based graphics processing system and the texel's width is an integer multiple of a native tile width used in the tile-based graphics processing system, and
  for each tile to be rendered: determining from the fragment density map a fragment size to be used to render the tile, performing sampling using the determined fragment size and performing fragment shading using the determined fragment size.

2. The method according to claim 1, wherein tiling the primitives in the scene comprises storing in a memory data for each tile indicating which primitives overlap at least partially with that tile.

3. The method according to claim 2, wherein the rendering phase comprises, for each tile, retrieving from the memory the data indicating which primitives overlap at least partially with that tile.

4. The method according to claim 1, wherein the native tile height and native tile width are the maximum tile height and maximum tile width, respectively, that the tile-based graphics processing system is configured to process using single sample points as single pixels.

5. The method according to claim 1, wherein performing sampling using the determined fragment size further comprises determining the positions of sample points to be used from the determined fragment size.

6. The method according to claim 5, wherein determining the positions of sample points comprises using a stored pattern of sample points and scaling the pattern based on the determined fragment size.

7. The method according to claim 6, wherein the tile-based graphics processing system is configured to store a plurality of patterns of sample points, each pattern for a different anti-aliasing setting, and using a stored pattern of sample points comprises selecting one of the plurality of patterns based on an anti-aliasing setting to be used to render the frame.

8. The method according to claim 1, wherein the tile-based graphics processing system is configured to use a buffer to store sampling data identifying which primitives are visible at which sample points, the buffer being sized to accommodate a number of samples corresponding to the native tile width and native tile height.

9. The method according to claim 8, wherein performing fragment shading using the determined fragment size further comprises determining an active region of the buffer based on the determined fragment size, using the active region to store sampling data and accessing sampling data from only the active region to be used in fragment shading.

10. A graphics processing system configured to render a frame showing a scene formed by primitives in a tile-based graphics processing system, the system comprising:
 geometry processing logic configured to:
  tile the primitives in the scene, to determine which primitives at least partially overlap which tiles of the frame to be rendered; and
 rendering logic configured to:
  obtain a fragment density map defining one or more texels, each texel corresponding to an area of the frame to be rendered and having an associated fragment size, wherein for each of the texels, the texel's height is an integer multiple of a native tile height used in the tile-based graphics processing system and the texel's width is an integer multiple of a native tile width used in the tile-based graphics processing system, and
  for each tile to be rendered: determine from the fragment density map a fragment size to be used to render the tile, perform sampling using the determined fragment size and perform fragment shading using the determined fragment size.

11. The graphics processing system according to claim 10, wherein the geometry processing logic configured to tile the primitives in the scene is further configured to store in a memory data for each tile indicating which primitives overlap at least partially with that tile.

12. The graphics processing system according to claim 10, wherein the native tile height and native tile width are the maximum tile height and maximum tile width, respectively, that the tile-based graphics processing system is configured to process using single sample points as single pixels.

13. The graphics processing system according to claim 10, wherein the rendering logic configured to perform sampling using the determined fragment size is further configured to determine the positions of sample points to be used from the determined fragment size.

14. The graphics processing system according to claim 10, wherein the tile-based graphics processing system comprises a buffer to store sampling data identifying which primitives are visible at which sample points, the buffer being sized to accommodate a number of samples corresponding to the native tile width and native tile height.

15. The graphics processing system according to claim 10 wherein the graphics processing system is embodied in hardware on an integrated circuit.

16. A non-transitory computer-readable storage medium having stored thereon computer readable code configured to cause the method as set forth in claim 1 to be performed when the code is run.

17. A non-transitory computer-readable storage medium having stored thereon an integrated circuit definition dataset that, when processed in an integrated circuit manufacturing system, configures the integrated circuit manufacturing system to manufacture a graphics processing system as set forth in claim 10.

18. An integrated circuit manufacturing system configured to manufacture a graphics processing system as set forth in claim 10.

* * * * *